United States Patent
Yen

(12) 
(10) Patent No.: US 6,811,172 B2
(45) Date of Patent: Nov. 2, 2004

(54) REMOTE COUPLED STEERING LINKAGE FOR A BICYCLE OR TRICYCLE

(75) Inventor: Sylvester Yen, Short Hills, NJ (US)

(73) Assignee: Yenson LLC, Short Hills, NJ (US)

( * ) Notice: Subject to any disclaimer, the term of this patent is extended or adjusted under 35 U.S.C. 154(b) by 0 days.

(21) Appl. No.: 10/234,265

(22) Filed: Sep. 4, 2002

(65) Prior Publication Data

US 2004/0041364 A1 Mar. 4, 2004

(51) Int. Cl.[7] .............................. B62B 3/12; B62K 9/02
(52) U.S. Cl. ...................... 280/270; 280/231; 280/282; 280/774
(58) Field of Search .................. 280/774, 270, 280/263, 231, 230, 282

(56) References Cited

U.S. PATENT DOCUMENTS

| | | | | |
|---|---|---|---|---|
| 393,417 A | * | 11/1888 | Brown | 280/257 |
| 436,873 A | * | 9/1890 | Hardy | 280/217 |
| 477,583 A | * | 6/1892 | Van Bibber | 280/270 |
| 616,481 A | * | 12/1898 | Miehle | 280/231 |
| 629,179 A | * | 7/1899 | Stephens | 280/270 |
| 641,816 A | * | 1/1900 | Watson | 280/202 |
| 1,059,466 A | * | 4/1913 | Hosmer | 280/202 |
| 2,182,345 A | | 12/1939 | Mieher | |
| 3,485,507 A | | 12/1969 | Christof | |
| 4,502,705 A | | 3/1985 | Weaver | |
| 4,541,647 A | | 9/1985 | Braun | |
| 4,659,098 A | | 4/1987 | Jacobson | |
| 4,773,663 A | | 9/1988 | Sawyer et al. | |
| 4,778,192 A | | 10/1988 | McElfresh | |
| 4,826,190 A | | 5/1989 | Hartmann | |
| 5,380,025 A | | 1/1995 | Thorpe | |
| 5,485,893 A | | 1/1996 | Summers | |
| 5,924,713 A | | 7/1999 | Li | |
| 6,120,048 A | | 9/2000 | Li | |
| 2003/0038448 A1 | * | 2/2003 | Efflandt, Sr. | 280/261 |
| 2003/0141693 A1 | * | 7/2003 | Wu | 280/263 |

FOREIGN PATENT DOCUMENTS

DE 3841751 * 6/1990

* cited by examiner

Primary Examiner—Kevin Hurley
(74) Attorney, Agent, or Firm—Klauber & Jackson

(57) ABSTRACT

A vehicle such as a bicycle or tricycle having a front steering assembly and a remote, rear steering assembly. The front steering assembly has a steering sleeve with a rotatable front shaft within the sleeve that is connected to the front wheel. The rear steering assembly has a rear shaft rotatably mounted in a steering sleeve and both of the shafts has a steering device such as handlebars accessible to users. The shafts are coupled together to rotate in tandem by means of a substantially flexible coupling, such as a chain operatively connected between sprockets mounted to each of the shafts. Turning either of the handlebars thus turns the front wheel to steer the vehicle.

12 Claims, 3 Drawing Sheets

REMOTE COUPLED STEERING LINKAGE FOR A BICYCLE OR TRICYCLE

BACKGROUND OF THE INVENTION

The present invention relates to a vehicle having a tandem or dual steering system, and, more particularly, to a tricycle or bicycle that can be steered from both a main steering assembly and a remote steering assembly.

There are, of course, various reasons for the use of a dual steering function on a vehicle such as a bicycle or a tricycle. In the case of a bicycle, such as a tandem bicycle or other bicycle where two riders are actually riding on the vehicle, it is advantageous to have a steering capability of both riders so that either can take over and command the steering function.

In the case of a tricycle, there is an advantage in that the young child learning to ride the tricycle can exercise control of the steering function but with a secondary or remote steering mechanism that can be accessible to an adult following behind to take over that steering function if the young child is steering in an erratic manner and needs guidance in the direction of the tricycle to avoid hitting an object or losing control of the vehicle.

Accordingly, certain remote steering devices have been proposed and in general such devices have been limited to use with either a bicycle or a tricycle. For example, in U.S. Pat. Nos. 5,924,713 and 6,120,048, both of Li, there is a auxiliary steering device adapted for use with a tricycle and the steering mechanism utilizes a pair of rods that communicate the steering function from a remote site to the main steering site. A difficulty in the LI systems, however, is in the use of solid rods that can be bent if overstressed and also the mechanism and its components are fairly open to the exterior environment and therefore unprotected. Thus there is a danger that a person or a person's clothing can become entangled with the components of the mechanism.

In addition, the prior mechanisms for carrying out a remote steering function, including the Li systems, are generally limited in their ability to radially rotate the steered wheel, that is, there is only a limited amount that the main steering assembly and the remote steering assembly can be rotated in maneuvering the vehicle.

It would be advantageous to have a system that provides a linkage between the main steering assembly and a remote steering assembly that can be used on both a bicycle or a tricycle, has the ability to allow unlimited rotation of the steered wheel, is protective of the components of the respective assemblies and has a substantially flexible coupling between the main steering assembly and the remote steering assembly.

SUMMARY OF THE INVENTION

Accordingly, the present invention relates to a vehicle having a dual steering system that can be used with either a tricycle or a bicycle. In the invention the vehicle includes a frame having both a front steering sleeve and a rear steering sleeve with a transverse support arm that extends between the front steering sleeve and the rear steering sleeve.

A front shaft and a rear shaft are rotatably mounted within, respectively, the front steering sleeve and the rear steering sleeve. At the upper end of each of the front shaft and the rear shaft are steering devices that can be grasped by a user to rotate the front and rear shafts. Preferably, the front and the rear shafts are mounted so as to be parallel to each other.

The front shaft extends downwardly from the front steering sleeve and a front or steered wheel is rotatably affixed to the lower end of the front shaft so that the steered wheel can be turned as the front steering device and front shaft are turned to steer the vehicle. At least one rear wheel is also rotatably mounted to the frame, that is, if the vehicle is a bicycle, there is one rear wheel and if the vehicle is a tricycle, there are two rear wheels.

There is a coupling that connects the front and rear shafts so the both shafts turn together in tandem. Preferably, the coupling is a substantially flexible chain that is operatively connected to sprockets that are located on both of the front and rear shafts so that the coupling of the shafts is positive. Accordingly, rotating either the front steering device or the rear steering device will rotate both the front and rear shafts and, since the front wheel or steered wheel is affixed to the lower end of the front shaft, the movement of either the front or rear shafts will effectively steer the vehicle.

With the above dual steering system, the same steering system can be used with either a bicycle or a tricycle with equal applicability. In the preferred embodiment, the substantially flexible coupling is fully enclosed within the transverse support arm so that the coupling mechanism is protected and cannot catch on the users clothing or cause harm to the user during its operation. In addition, with the present invention, there is no rotational limit on the amount of turning of the steered front wheel and it can actually be rotated 360 degrees if desired, thus the ability to fully steer the vehicle is not constrained by any turning limits.

These and other features and advantages of the present invention will become more readily apparent during the following detailed description taken in conjunction with the drawings herein.

DETAILED DESCRIPTION OF THE INVENTION

Figure 1:
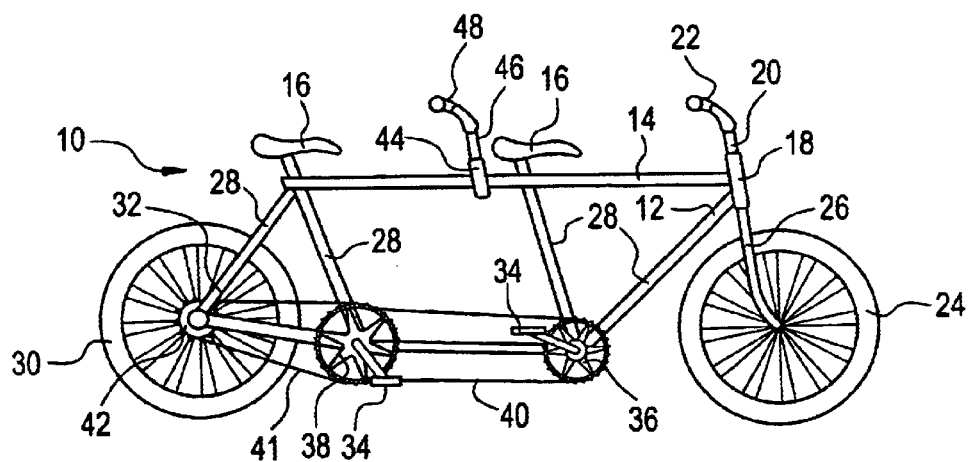
FIG. 1 is a side view of a tandem bicycle that utilizes the dual steering system of the present invention.

Referring now to FIG. 1, there is shown a side view of a tandem bicycle 10 utilizing the present invention and where there is a bicycle frame 12 generally comprising a transverse support arm 14 oriented substantially horizontally and to which is mounted a pair of seats 16 to support the riders during the use of the tandem bicycle 10. At the front of the transverse support 14 there is a front steering sleeve 18 that is a conventional component that supports a front shaft 20 rotatably affixed within the front steering sleeve 18 and the front shaft 20 supports a steering device, such as front handlebars 22.

At the lower end of the front shaft 20 there is rotatably mounted a front wheel 24 and there may be a front fork 26 that mounts the front wheel 24 to the front shaft 20 that is a bifurcated member extending downwardly to span the front wheel 24 to sandwich the front wheel 24 between the bifurcated legs of the front fork 26.

Thus, as is conventional, by turning the front handlebars 22, the front wheel 24 also turns so that the front wheel 24 is the steered wheel and controls the direction of travel of the tandem bicycle 10.

Other conventional components of a tandem bicycle 10 include various bracing bars 28 that make up the bicycle frame 12 and a rear wheel 30 that is rotatably affixed to the bicycle frame 12, normally through the use of a rear fork 32 that is also bifurcated in the same manner as the front fork 26. To move the tandem bicycle 10, there are a pair of pedals 34 that extend outwardly so as to rotate front and a rear sprockets 36, 38, the front and rear sprockets 36, 38 being coupled together by means of a coupling chain 40 so as to rotate together when powered by the riders. The rotational motion of the sprockets 36, 38 is transferred to power the rear wheel 30 by a drive chain 41 that couples the rear sprocket 38 to a rear wheel sprocket 42.

Accordingly, what has been described to this point are generally the conventional components and structure of a tandem bicycle 10, however, as can be seen, there is an additional rear steering sleeve 44 rotatably mounting a rear shaft 46 and which has a steering device, such as rear handlebars 48 atop of the rear shaft 46. As will later be described, the front shaft 20 that controls the direction of the front wheel 24 in steering the tandem bicycle 10, is coupled in tandem to the rear shaft 46 by a coupler such that the two shafts move together, that is, the turning of either the front handlebars 22 or the rear handlebars 48 will turn the front wheel 24 to carry out the steering of the tandem bicycle 10.

Figure 2:
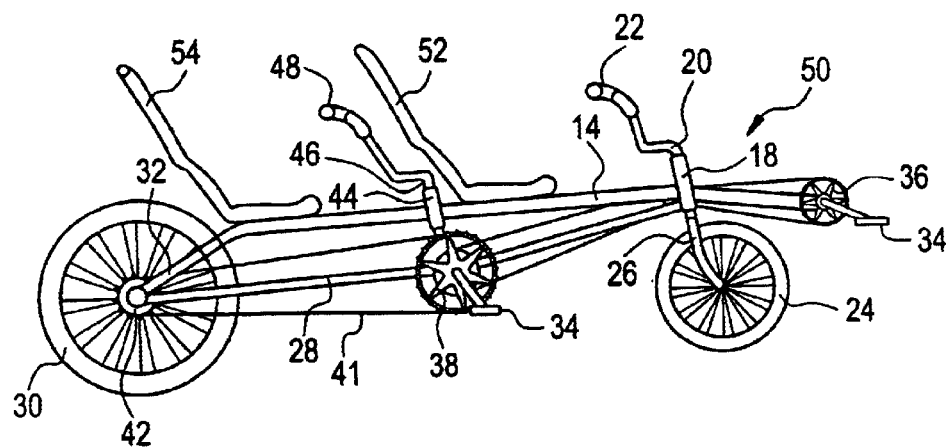
FIG. 2 is side view of a tandem recumbent bicycle that also utilizes the present system.

Turning now to FIG. 2, there is shown a side view of a tandem recumbent bicycle 50 and, since most of the components and features are generally the same as in the FIG. 1 embodiment, like numbers has been applied to the like components of the FIG. 2 embodiment, it being seen that a major difference appears in the location of the front and rear sprockets 36, 38 since they are displaced forwardly to allow the riders to recline back in the front and rear seats 52, 54 in order to pedal the tandem recumbent bicycle 50.

Again, however, the feature of the present invention can be seen in that there is a front steering sleeve 18 and a rear steering sleeve 44 that, as will later be explained, both rotatably support, respectively, a front shaft 20 and a rear shaft 46 that are coupled together and therefore turn simultaneously, that is, as either set of the front handlebars 22 or rear handlebars 48 is turned by either rider, the turning motion will be transmitted to the front wheel 24, the steered wheel, so that the front wheel 24 will direct the tandem recumbent bicycle 50 in accordance with the action of either of the riders.

Figure 3:
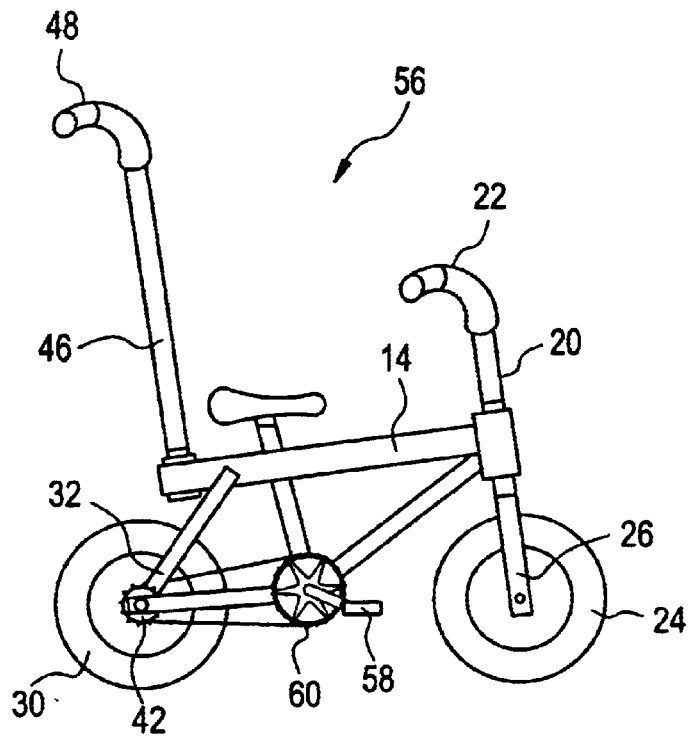
FIG. 3 is side view of a bicycle having the present dual steering system.

Turning now to FIG. 3, there is shown a side view of a bicycle 56 utilizing the present invention and, again, where applicable, like numbers have been applied to corresponding components of the FIG. 1 and FIG. 2 embodiment. As can be seen, in the FIG. 3 embodiment, the rear shaft 46 extends upwardly a greater distance than in the FIG. 1 and FIG. 2 embodiments since the remote steering feature of the present invention is intended, in this embodiment, to be a rear steering device to be used by an adult, such as a parent, that is assisting a youngster in steering the bicycle 56.

As such, the rear handlebars 48 are located vertically high so that the parent can walk or run behind the youngster riding on the bicycle 56 and both push the bicycle 56 as well as control the steering of the front wheel 24 to steer the bicycle 56. As also can be seen, there is, of course only a single set of pedals 58 and a single drive sprocket 60 since there is only one rider that is using the bicycle 56 of the FIG. 3 embodiment, however, again the remote steering system of the present invention is used to enable the parent, as well as the youngster, to both control the steering of the bicycle 56 by the coupling between the front shaft 20 and the rear shaft 46, as will be later explained.

Figure 4:
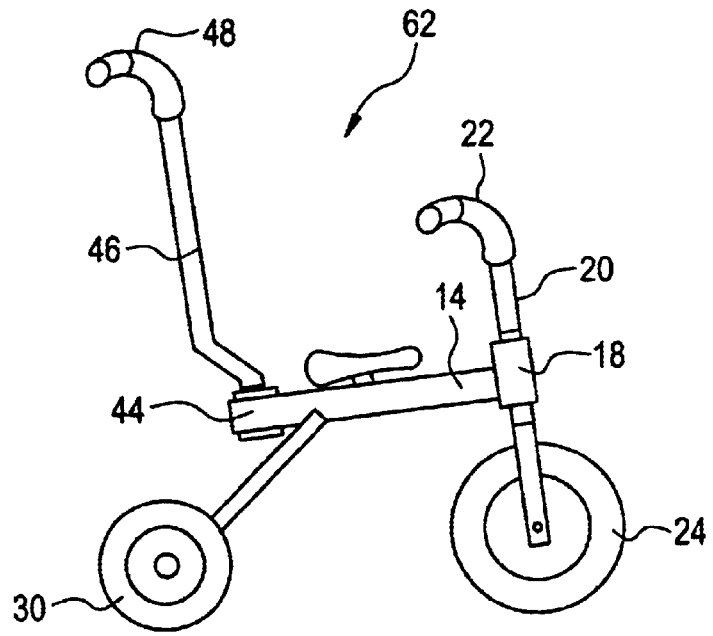
FIG. 4 is side view of a tricycle that also uses the present dual steering system.

Turning next to FIG. 4, there is shown a side view of a tricycle 62 that also can take advantage of the present invention and, as can be seen, the tricycle 62 as is conventional, has a single front wheel 24 and pair of spaced apart rear wheels 30 (only one of which is shown in FIG. 4). Again, however there is a front and a rear steering sleeve 18, 44 rotatably supporting, respectively, a front shaft 20 and a rear shaft 46 at opposite ends of the transverse support arm 14 so that the remote steering system of the resent invent can operate to tandem control the turning of the front wheel 24 simultaneously by turning either the front handlebars 22 or the rear handlebars 48. As with the FIG. 3 embodiment, the rear shaft 46 extends upwardly from the rear steering sleeve 44 sufficiently elevated to enable a parent or other adult to both push the tricycle 62 as well as to steer the tricycle 62 by turning the rear handlebars 48.

Therefore, as can now be seen by the FIGS. 1–4, the present invention is equally applicable to a variety of vehicles, that is, to bicycles and tricycles and to different types of each of those vehicles.

Figure 5:
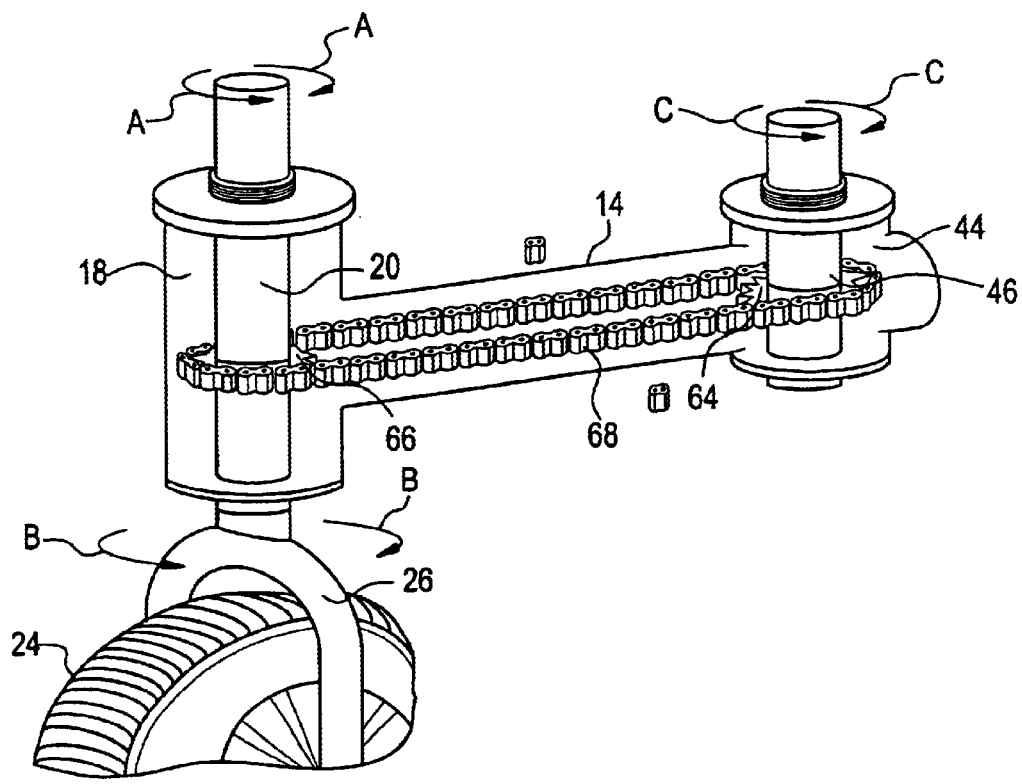
FIG. 5 is a perspective view, taken from the front and side, partially cut away, showing the dual steering system of the present invention.

Turning now to FIG. 5, there is shown a perspective view, taken from the front side, and partially cut away illustrating the remote steering system of the present invention, and, as can be seen, the front steering sleeve 18 and the rear steering sleeve 44 are joined together by the transverse support arm 14 which has a space in its interior. The front shaft 20 is rotatably mounted within the front steering sleeve 18 and extends upwardly therefrom and to which the front handlebars 22 are affixed (FIGS. 1–4). The front shaft 20 also extends downwardly from the front steering sleeve 18 and is connected to the front fork 26 to which the front wheel 24 is affixed in convention manner.

As such, by turning the front shaft 20, shown by the arrows A, the front wheel 24 will also turn in steering the vehicle as shown by the arrows B. The same is basically true of the rear steering sleeve 44 where there is a rear shaft 46 that is rotatably supported within the rear steering sleeve 44 and rotates as shown by the arrows C. As also can be seen, there is a tandem coupling system that connects the rear shaft 46 and the front shaft 20 so that they rotate together and that system is fully contained within the interior space within the transverse support arm 14 so as to not interfere with the user in riding the vehicle, thus, the user's clothing cannot catch on any of the components of the system or the user injured by contacting any of such components.

The tandem coupling system includes a rear sprocket 64 affixed to the rear shaft 46 and a front sprocket 66 affixed to the front shaft 20 and a substantially flexible connector, such as a bicycle chain 68, that is operatively fitted to both the front and rear sprockets, 66, 64 so that both sprockets as well as the front and rear shafts 20, 46 must rotate together.

Figure 6:
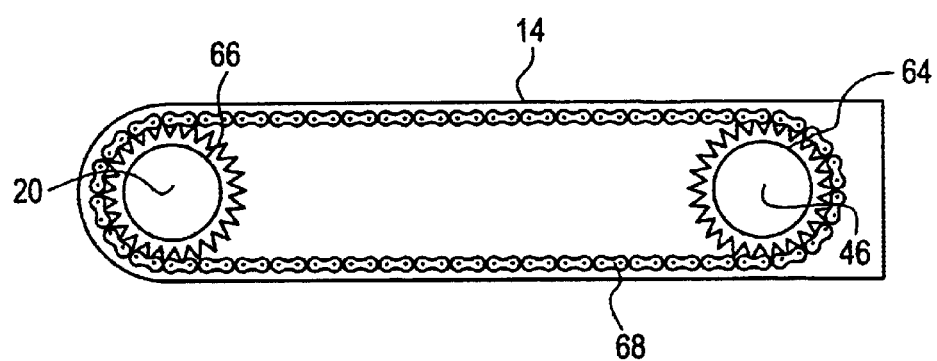
FIG. 6 is top view of the coupling used to carry out the present dual steering system.

In FIG. 6, there is a top view of the interior space of the transverse support arm 14 showing the interconnection of the front and rear sprockets 66, 64 so that the front and rear shafts 20, 46 move together in tandem. By use of a substantially flexible coupling, that is, the bicycle chain 68, the front and rear shafts 20, 46 are securely and fully coupled together and yet the coupling is strong and rugged in construction. It should also be noted that with the present invention, there is an unlimited rotational movement of the front and rear shafts 20, 46, that is, both shafts are free to rotate a full 360. degrees, if desired, and therefore the steering capability of the front wheel 24 is also not limited to any specific rotational movement.

Those skilled in the art will readily recognize numerous adaptations and modifications which can be made to the remote steering system of the present invention which will result in an improved process and device, yet all of which will fall within the scope and spirit of the present invention as defined in the following claims. Accordingly, the invention is to be limited only by the following claims and their equivalents.

I claim:

1. A vehicle having a dual steering capability, said vehicle comprising a frame having a front steering sleeve and a rear steering sleeve and having at least one seat affixed to the frame, said frame including a transverse support arm extending between said front steering sleeve and said rear steering sleeve, a rear shaft rotatably affixed within said rear steering sleeve, and a front shaft extending downwardly from said front steering sleeve and rotatably affixed within said front steering sleeve, a rear wheel rotatably affixed to said frame and a front wheel rotatably affixed to said front shaft, a front steering device affixed to said front shaft, said front steering device adapted to be grasped by a user to rotate said front shaft, and a rear steering device affixed to said rear shaft,said rear steering device adapted to be grasped by a user to rotate said rear shaft, and a substantially flexible coupling located within said transverse support arm, said substantially flexible coupling connecting said rear shaft and said front shaft such that the rotation of either the rear steering device or the front steering device rotates said front shaft and said front wheel to steer the vehicle, wherein said vehicle is a tandem bicycle.

2. A vehicle as defined in claim 1, wherein said substantially flexible coupling comprises a chain.

3. A vehicle as defined in claim 1, wherein said each of said front and rear shafts have sprockets affixed thereto and said substantially flexible coupling is a chain operatively coupled to each of said sprockets.

4. A vehicle as defined in claim 1 wherein said front and said rear shafts are generally parallel to each other.

5. A vehicle as defined in claim 1 wherein said front steering device and said rear steering device are both handlebars.

6. A vehicle having a dual steering capability, said vehicle comprising a frame having a front steering sleeve and a rear steering sleeve and having at least one seat affixed to the frame, said frame including a transverse support arm extending between said front steering sleeve and said rear steering sleeve, a rear shaft rotatably affixed within said rear steering sleeve, and a front shaft extending downwardly foam said front steering sleeve and rotatably affixed within said front steering sleeve, a rear wheel rotatably affixed to said frame and a front wheel rotatably affixed to said front shaft, a front steering device affixed to said front shaft, said front steering device adapted to be grasped by a user to rotate said front shaft, and a rear steering device affixed to said rear shaft, said rear steering device adapted to be grasped by a user to rotate said rear shaft, and a substantially flexible coupling located within said transverse support arm, said substantially flexible coupling connecting said rear shaft and said front shaft such that the rotation of either the rear steering device or the front steering device rotates said front shaft and said front wheel to steer the vehicle, wherein said vehicle is a tricycle.

7. A method of providing a dual steering control for a vehicle, said method comprising the steps of:

providing a vehicle having a frame including a transverse support arm;

providing a front steering assembly at one end of the transverse support arm having a front shaft connected to the front wheel of the vehicle and located within a steering sleeve, the front shaft having a front steering device adapted to be grasped by a user to rotate the front shaft, providing a rear steering assembly at the other end of the transverse support arm having a rear shaft rotatably located within a steering sleeve, the rear shaft having a rear steering device adapted to be grasped by a user to rotate the rear shaft, connecting the front and the rear shafts by means of a flexible coupling; and locating the flexible coupling within the transverse support arm, wherein said step of providing dual steering control for a vehicle comprises providing dual steering control for a tricycle.

8. A method of providing a dual steering control for a vehicle, said method comprising the steps of:

providing a vehicle having a frame including a transverse support arm;

providing a front steering assembly at one end of the transverse support arm having a front shaft connected to the front wheel of the vehicle and located within a steering sleeve, the front shaft having a front steering device adapted to be grasped by a user to rotate the front shaft, providing a rear steering assembly at the other end of the transverse support arm having a rear shaft rotatably located within a steering sleeve, the rear shaft having a rear steering device adapted to be grasped by a user to rotate the rear shaft, connecting the front and the rear shafts by means of a flexible coupling; and locating the flexible coupling within the transverse support arm wherein said step of providing dual steering control for a vehicle comprises providing dual steering control for a tandem bicycle.

9. A method as described in claim 8 wherein said step of connecting the front and rear shafts comprises connecting the shaft by means of a chain.

10. A method as described in claim 8 wherein said step of providing a front steering assembly comprises providing a front steering assembly having a front shaft with a sprocket and said step of providing a rear assembly comprises providing a rear assembly having a rear shaft with a sprocket and said step of connecting the front and rear shafts comprises affixing the chain between the sprockets on said front and rear shafts.

11. A vehicle having a dual steering capability, said vehicle comprising a frame having a front steering sleeve and a rear steering sleeve and having at least one seat affixed to the frame, a front wheel and a rear wheel rotatably affixed to the frame, said frame including a transverse support arm extending between said front steering sleeve and said rear steering sleeve, a rear shaft within said rear steering sleeve and rotatably affixed to said rear steering sleeve, and a front shaft extending downwardly from said front steering sleeve and rotatably affixed to said front steering sleeve, a rear wheel rotatably affixed to said frame and a front wheel affixed to said front shaft, a front steering device affixed to said front shaft, said front steering device adapted to be grasped by a user to rotate said front shaft, and a rear steering device affixed to said rear shaft, said rear steering device adapted to be grasped by a user to rotate said rear shaft, and a coupling connecting said rear shaft and said front shaft such that the rotation of either the rear steering device or the front steering device rotates said front shaft and said front wheel to steer the vehicle, said coupling contained within said transverse support arm, wherein said vehicle is a tandem bicycle.

12. A vehicle having a dual steering capability, said vehicle comprising a frame having a front steering sleeve and a rear steering sleeve and having at least one seat affixed to the frame, a front wheel and a rear wheel rotatably affixed to the frame, said frame including a transverse support arm extending between said front steering sleeve and said rear steering sleeve, a rear shaft within said rear steering sleeve and rotatably affixed to said rear steering sleeve, and a front shaft extending downwardly from said front steering sleeve and rotatably affixed to said front steering sleeve, a rear wheel rotatably affixed to said frame and a front wheel affixed to said front shaft, a front steering device affixed to said front shaft, said front steering device adapted to be grasped by a user to rotate said front shaft, and a rear steering device affixed to said rear shaft, said rear steering device adapted to be grasped by a user to rotate said rear shaft, and a coupling connecting said rear shaft and said front shaft such that the rotation of either the rear steering device or the front steering device rotates said front shaft and said front wheel the steer the vehicle, said coupling contained within said transverse support arm, wherein said vehicle is a tricycle.

* * * * *